US010132716B2

(12) United States Patent
Zhou et al.

(10) Patent No.: US 10,132,716 B2
(45) Date of Patent: Nov. 20, 2018

(54) METHOD FOR MEASURING MODE FIELD DIAMETER OF SINGLE-MODE FIBRE USING OPTICAL INTEGRATION TECHNIQUE EMPLOYING GRADUALLY VARIABLE APERTURE

(71) Applicants: Jin Zhou, Guangdong (CN); Wenjun Zhou, Guangdong (CN)

(72) Inventors: Jin Zhou, Guangdong (CN); Wenjun Zhou, Guangdong (CN)

(*) Notice: Subject to any disclaimer, the term of this patent is extended or adjusted under 35 U.S.C. 154(b) by 0 days.

(21) Appl. No.: 15/996,513

(22) Filed: Jun. 3, 2018

(65) Prior Publication Data

US 2018/0274906 A1    Sep. 27, 2018

Related U.S. Application Data

(63) Continuation of application No. PCT/CN2016/070567, filed on Jan. 11, 2016.

(51) Int. Cl.
*G01M 11/00* (2006.01)
*G02B 5/00* (2006.01)
*G01J 1/04* (2006.01)

(52) U.S. Cl.
CPC ............ *G01M 11/33* (2013.01); *G01J 1/0437* (2013.01); *G02B 5/005* (2013.01)

(58) Field of Classification Search
CPC .... G01M 11/30; G01M 11/33; G01M 11/331; G01M 11/332; G01M 11/335;
(Continued)

(56) References Cited

U.S. PATENT DOCUMENTS 4,037,964 A * 7/1977 Wertheimer ....... G01N 15/0211
                                                    356/336
4,636,071 A * 1/1987 Lowe ..................... G01N 21/59
                                                    356/225
(Continued)

FOREIGN PATENT DOCUMENTS

JP          0674861 A      3/1994

OTHER PUBLICATIONS

Zhou, Wenjun et al.,"The Theoretical and Experimental Study of Mask Measuring System",Acta Electronica Sinica,Nov. 30, 1989,pp. 62-63,part 2,and figure 1.
(Continued)

*Primary Examiner* — Gordon J Stock, Jr.
(74) *Attorney, Agent, or Firm* — Wayne & Ken, LLC; Tony Hom (57) ABSTRACT

The present invention discloses a method for measuring a mode field diameter (MFD) of a single-mode fiber using an optical integration technique employing a gradually variable aperture. The method transforms, according to Petermann II definition, an integral operation in a formula of an MFD of a single-mode fiber into elementary arithmetic operations to be performed on a mean square value of the numerical aperture of the fiber. By using an optical integrator having a gradually variable aperture, the mean square value of the numerical aperture of the single-mode fiber can be precisely measured by one of the following three methods: translation, rotation and beam splitting, thus accordingly solving the MFD of the test fiber. The aforementioned measurement an MFD of a single-mode fiber is characterized by precision, high speed and convenience, and can be widely applied in various applications, such as measurement standards, automated test equipment, and engineering instruments.

5 Claims, 7 Drawing Sheets

(58) Field of Classification Search
CPC ............. G01M 11/336; G01M 11/337; G01M 11/338; G03F 1/14; G03F 1/16; G01J 3/0229; G01J 1/0437; G03B 9/00; G03B 9/02; G03B 9/04; G03B 9/06; G03B 9/07; G03B 9/08; G03B 9/10; G03B 9/12; G03B 9/14; G03B 9/16; G03B 9/18; G03B 9/20; G03B 9/22; G03B 9/24; G03B 9/26; G03B 9/28; G03B 9/30; G03B 9/32; G03B 9/34; G03B 9/36; G03B 9/38; G03B 9/40; G03B 9/41; G03B 9/44; G03B 9/46; G03B 9/48; G03B 9/52; G03B 9/54; G02B 5/003; G02B 5/005; G02B 5/006; G02B 5/22; G02B 5/223; G02B 5/226; G02B 5/24; G02B 26/02; G02B 26/023; G02B 26/0236; G02B 26/04; G02B 27/0988; G01B 11/08

USPC ................. 356/73.1; 359/227–236, 885–895
See application file for complete search history.

(56) References Cited

U.S. PATENT DOCUMENTS

| 4,664,516 | A | * | 5/1987 | Coppa | ................ | G01N 21/412 |
| | | | | | | 356/73.1 |
| 4,759,625 | A | * | 7/1988 | Caponi | ................ | G01M 11/33 |
| | | | | | | 356/73.1 |
| 4,934,819 | A | * | 6/1990 | Coppa | ................ | G01J 1/4257 |
| | | | | | | 356/121 |
| 5,642,456 | A | * | 6/1997 | Baker | ................ | G02B 6/266 |
| | | | | | | 359/230 |

OTHER PUBLICATIONS

Kuwaki,N,et,al.,"Mode-Field-Diameter Measurement Method Using a Field Mask",Electronics and Communications in Japan,Dec. 31, 1995,the whole document.
Li,Chunsheng et al.,"Study on Mode Field Diameter Standard of Single-mode Optical Fiber",Modern Transmission,Apr. 30, 2013,the whole document.
Bai,Aimin,"Measurement of Mode Field Diameter of Single Mode Fibers by Far-field Mask Method",Study on Optical Communications,Dec. 31, 1987,the whole document.

* cited by examiner

METHOD FOR MEASURING MODE FIELD DIAMETER OF SINGLE-MODE FIBRE USING OPTICAL INTEGRATION TECHNIQUE EMPLOYING GRADUALLY VARIABLE APERTURE

FIELD OF THE INVENTION

The present invention belongs to the technical field of test methods and measurement in optical fibre communications, and also relates to sophisticated instruments and equipment and measurement standards, in particular to a method for measuring optical fibre characteristic parameters, disclosing a novel method of measuring a mode field diameter (MFD) of a single-mode fibre.

BACKGROUND OF THE INVENTION

As one of the important characteristic parameters of a single-mode fibre, the mode field diameter (MFD), directly influences important characteristics of splicing loss, anti-bending performance and the like of the fibre. It is also a necessarily-measured parameter in production and application of optical fibres and cables. At present, the yield of the single-mode fibre has reached hundreds of millions of core kilometers in the world, and the huge measurement workload can be imagined. To constantly explore a method for rapidly and accurately measuring these data is always a common goal for scientific workers in the industry.

With respect to measurement of the MFD, three existing methods recognized by international standards are as follows: a far field scan method as a reference test method, a variable aperture method as an alternative test method, and a near field scan method. These standard test methods are all based on the Petermann II definition. A primary formula of the definition is a ratio of two integrals. In these standard methods, the integrals are not processed as a whole, but are segmented into a plurality of parts to be sampled; and then the parts are combined together according to a corresponding formula; so as an integral formula in the Petermann II definition is approximated as summation of several finite term series. In such a process, there is obviously a deviation. To reduce this deviation, more items have to be segmented and measured, which inevitably leads to an increase of measurement time (time consumed for measuring a mode field at a wavelength often takes tens of seconds, or even a few minutes), thereby reducing the measurement speed. Such a basic contradiction cannot be solved through the existing standard test methods. A novel way must be explored and a novel measurement method must be searched. Regards to the mask method, its improvement enables measurement of the MFD rapidly and accurately (see reference document 1) and measurement accuracy can reach better than 0.05 μm (see reference document 2) which is as good as that in the variable aperture method, however, theoretical preciseness has been influenced as a sacrificed in the mask method due to a paraxial approximation adopted in geometrical optics.

Reference document 1: Zhou Wenjun, Theoretical and Experimental Study of Mask Measurement *System Chinese Journal of Electronics*, Volume 17, Issue 6, (November, 1989), Page 61.

Reference document 2: Multi-Parameter Test Apparatus for Single-Mode fibre, Registration No. 902548, *Bulletin of Scientific & Technological Achievements*, (1992), State Scientific and Technological Commission.

SUMMARY OF THE INVENTION

The purpose of the present invention is to overcome a contradiction between measurement accuracy and measurement speed in the existing standard test method for a mode field diameter (MFD) of a single-mode fibre. The present invention proposes a novel method of measuring an MFD of a single-mode fibre, which is referred to as an optical integration technique employing gradually variable aperture. The present invention may be called an optical integration technique for short.

This optical integration technique is distinctive from the previous standard methods which not only demands replicates of multi-point samples but also contains independent treatments of segmentation and integral composition using the Petermann definition. This novel optical integration technique takes the integrals as a whole, and uses an integrator with ingenious design to complete the integrals by virtue of an optical method. The present invention may further be called a gradually variable aperture method relative to a variable aperture method. The integrator is equivalent to a series of countless apertures of which angle varies continuously from 0 to 25 degrees, which cannot be achieved in the existed universal variable aperture methods. Firstly, the number of the apertures is often restricted (generally less than 20) in the variable aperture method. Additionally, apertures with the angular apertures between 0 and 5 degrees are difficult to manufacture, restricting the measurement points where the maximum optical power density is possibly located. Deviations may possibly be induced.

The present invention transforms integrals in Petermann II definition into a mean square value of a numerical aperture NA from the fibre at first. The mean square value $\overline{NA^2}$ has an obvious physical significance, and may also be obtained by an optical power ratio measured under two conditions that outgoing light of the test fibre passes through and does not pass through a gradually variable aperture optical integrator respectively. In this way, because of no any approximation, the measured MFD has high accuracy, and the measurement speed is more than ten times of the measurement speed of the variable aperture method.

According to the Petermann definition, the MFD may be represented as follows:

$$\mathrm{MFD} = (2/\pi)[2\int_0^\infty q^3 F^2(q)dq / \int_0^\infty q F^2(q)dq]^{-1/2} \quad (1)$$

In the formula, $F^2(q)$ is far-field power distribution; $q=\sin\theta/2\lambda$, wherein $\theta$ is an aperture angle of the outgoing light, and $2\lambda$ is a wavelength of the outgoing light. When $q=\sin\theta/2\lambda$ is substituted into the formula (1), the following formula can be obtained:

$$\mathrm{MFD} = (2/\pi)[\int_0^\infty \sin^2\theta F^2(q)q dq / \int_0^\infty F^2(q)q dq]^{-1/2} \quad (2)$$

Apparently, an integral expression in a bracket of the formula (2) is the mean square value $\overline{NA^2}$ of the numerical aperture $NA=\sin\theta$ of the fibre.

$$\overline{NA^2} = \int_0^\infty \sin^2\theta F^2(q)q dq / \int_0^\infty F^2(q)q dq \quad (3)$$

When (3) is substituted into the formula (2), the following formula can be obtained:

$$\mathrm{MFD} = (\sqrt{2}\lambda/\pi)(\overline{NA^2})^{-1/2} \quad (4)$$

In fact, no matter which method (such as variable aperture method, far field mask method or gradually variable aperture method) is taken, it is only necessary to calculate the quadratic mean of the numerical aperture $\overline{NA^2}$ of fibre, since the MFD may be obtained by the universal formula (4). For example, if the variable aperture method is adopted, $\overline{NA^2}$ can be expressed as $\int_0^\infty \alpha(\theta) \sin 2\theta d\theta$, wherein $\alpha(\theta)$ is a complementary aperture function; whereas, the quadratic mean of the numerical aperture of fibre $\overline{NA^2}$ derived from the gradually variable aperture method, owns comparably higher convenience, higher efficiency and higher accuracy.

Detailed interpretation is as follows for formula (3): the denominator in the bracket of the formula (3) can be seen as a total optical power of the outgoing light, and is set as P(o); from the numerator in the bracket of the formula (3), it can be seen that the optical power at each outgoing angle $\theta$ will be affected by a factor of the square of the numerical aperture of the fibre, $\sin^2 \theta$ on the basis of P(o). Thus, a device should be designated so that all the light transmission power of light passing through the device at a varying $\theta$ can be expressed by the numerator of the formula (3) and is set as P(i). Thus, the following formula is obtained:

$$\overline{NA^2} = P(i)/kP(o) \tag{5}$$

When the formula (5) is substituted into the formula (4), the following formula can be obtained:

$$MFD = (\sqrt{2}\lambda/\pi)[kP(o)/P(i)]^{1/2} \tag{6}$$

Regarding to the device, a polar angle of the boundaries of the adjacent light transmitting regions shall be consistent with the corresponding numerical aperture, in the meanwhile characteristics shall be fulfilled hereinafter and the device is so called a gradually variable aperture optical integrator. The integrator includes a light-transmitting region and a light-proof region. The light-transmitting region is two adjacent apertures, forming a trumpet shape from a geometric center of the gradually variable aperture optical integrator extending to the outside area. The two adjacent apertures are central symmetric corresponding to the gradually variable aperture optical integrator, and a boundary of the light-transmitting region can meet a radial coordinate as follows:

$$\rho = D \times [2\varphi/(k\pi - 2\varphi)]^{1/2} \tag{7},$$

wherein $1 \le k \le 5$.

In the formula (7), D is a perpendicular distance from the fibre end face of a test fibre to the gradually variable aperture optical integrator; a central point of the gradually variable aperture optical integrator is the origin of the radial coordinate; $\rho$ is a polar radius of the boundary of the two apertures in the radial coordinate; $\varphi$ is a polar angle of the boundary of the two apertures in the radial coordinate. In order to meet a regulation in an international standard that a far-field scanning angle should not be less than 25 degrees, the following condition must be met:

$$R \ge D \times \tan(25°) \tag{8}$$

In the above formula, R is a maximum value $\rho_{max}$ of the polar radius of the boundary of the light transmission zone of the integrator, wherein tan(25°) represents a tangent value 25°. The optical integrator designed and used according to the formula (7) and the formula (8) are valid. According to the treatment of the above method, the MFD of the single-mode fibre can be rapidly and accurately measured by the formula (6); and moreover, appearances of the integrator may be circles, squares and rectangles. During use of the gradually variable aperture optical integrator, the gradually variable aperture optical integrator should be arranged coaxial and perpendicular to an optical axis of an optical imaging system; and by means of the characteristic that the light transmitting region of the gradually variable aperture optical integrator are in opposite symmetry in a horizontal direction and a vertical direction, the received optical power is minimized through horizontal adjustment, and the received optical power is maximized through vertical adjustment. By virtue of repeated adjustments, a requirement that the fibre end face of the test fibre is coaxial with the system is met.

The method of measuring a mode field diameter (MFD) of a single-mode fibre by using the optical integrator is:

directly obtaining an optical power P(o) collected by the light collection system without passing through the gradually variable aperture optical integrator, after the light with an operating wavelength of $2\lambda$ passes through the single-mode fibre;

moving the gradually variable aperture optical integrator into an outgoing light path of a test fibre;

measuring an optical power P(i) passing through the gradually variable aperture optical integrator, with an outgoing light with an operating wavelength of $\lambda$ sequentially passing by the gradually variable aperture optical integrator and the light collection system and a detector;

obtaining the MFD of single-mode fibre according to formula (6):

$$MFD = (\sqrt{2}\lambda/\pi)[kP(o)/P(i)]^{1/2} \tag{6}$$

In addition, a Fermat spiral and its corresponding MFD calculation can be easily deduced in the mask method with the paraxial approximation by simple operations of formula (7) and the formula (6) (see reference document 1). If adopting the variable-aperture method, there should be:

$$\overline{NA}^2 = \int_0^\infty \alpha(\theta)\sin 2\theta d\theta \approx T = \sum_1^n \alpha(\theta_i)\sin 2\theta_i(\theta_i - \theta_{i-1}).$$

Figure 7:
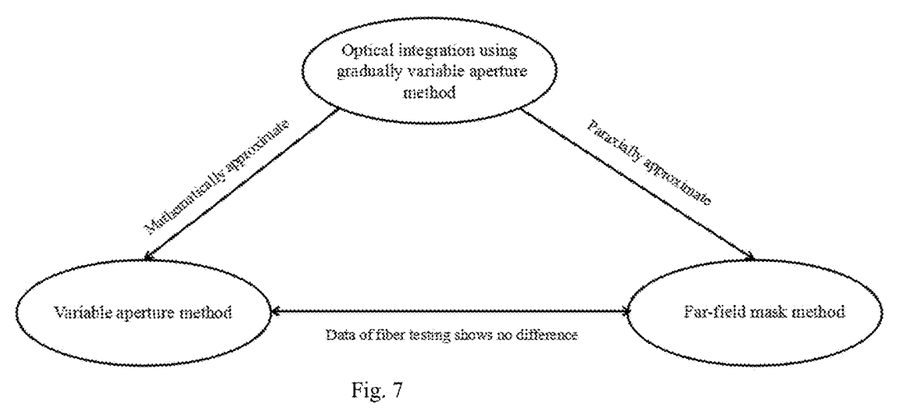
FIG. 7 is a schematic diagram of an interrelationship between the gradually variable aperture method, the variable aperture method and the far-field mask method.

That is to say, the variable aperture method may only obtain an approximation of the quadratic mean of the numerical aperture $\overline{NA}^2$ of fibre. FIG. 7 illustrates this interrelationship between the gradually variable aperture method, the variable aperture method and the far-field mask method.

The present invention has beneficial effects as follows: compared with the existing traditional measurement method, the present invention can accurately, rapidly and simply measure the MFD of the single-mode fibre to obtain the mean square value of the numerical aperture of the fibre with the clear physical significance, and is easy to measure a mode spot spectrum curve of the MFD that varies with the wavelength. The present invention can be widely applied in various aspects such as measurement, production, engineering and even scientific research and teaching. Because of the measurement accuracy, a more standard measuring instrument can be manufactured; because of the high measurement speed, high-efficiency automatic test instrument and equipment for industrial production can be manufactured, thereby saving lots of social labor time and increasing labor productivity; and because of simple and convenient operation, measuring instruments convenient for engineering applications can be designed. It is known that dispersion of the fibre is related to a mode spot spectrum, and the numerical aperture of the fibre is associated with refractive index distribution of the fibre. These intrinsic advantages can be involved into the scientific research and teaching, and through mutual combination and promotion, a high-efficiency integrated fibre tester with more functions may be expected to be produced, thereby further promoting the progresses of fibre transmission theories and test methods. In addition, compared with the existing instrument and equipment for measuring the MFD of the single-mode fibre, the test instrument manufactured by using the present invention will have higher cost performance, thereby saving and creating more social wealth.

DETAILED DESCRIPTION OF THE INVENTION

Figure 1:
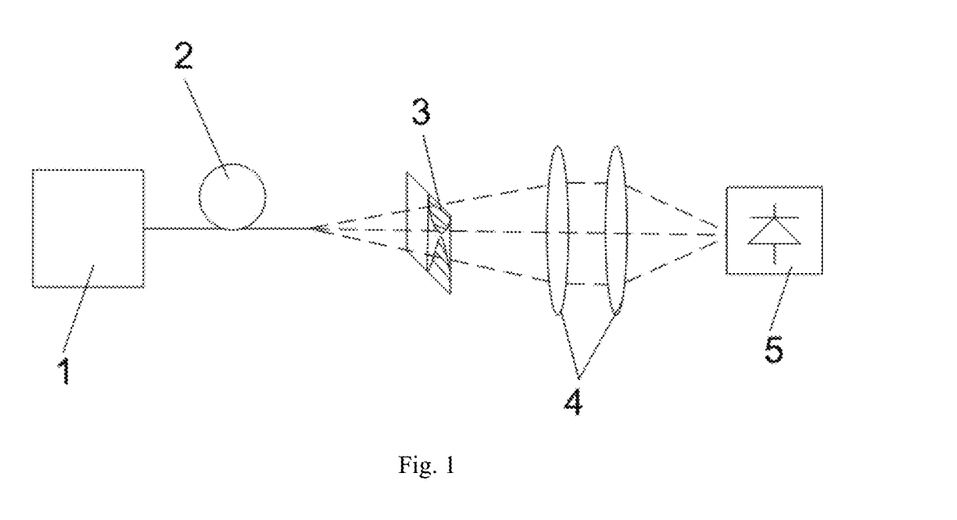
FIG. 1 is a working principle diagram of a sliding gradually variable aperture optical integrator.
Figure 2:
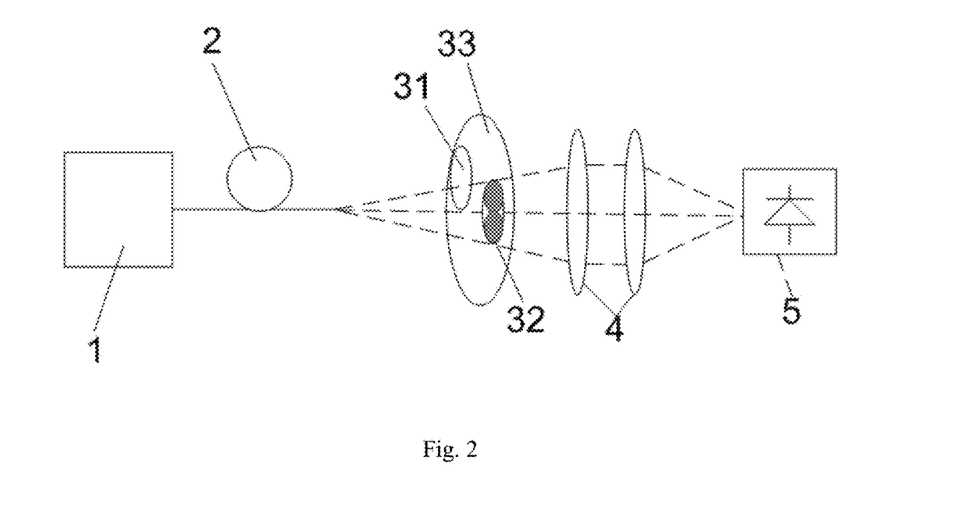
FIG. 2 is a working principle diagram of a rotating gradually variable aperture optical integrator.
Figure 3:
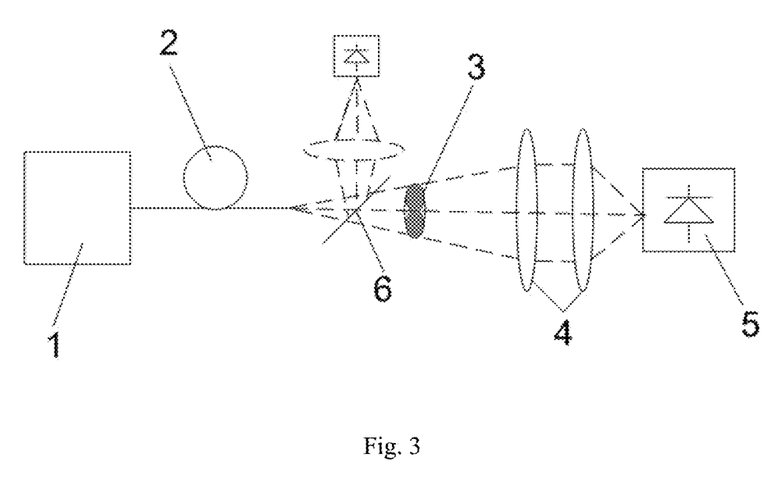
FIG. 3 is a working principle diagram of a fixing gradually variable aperture optical integrator after added a beam-splitting.

How to accurately and rapidly measure a mode field diameter (MFD) of a single-mode fibre in the present invention is further described below in detail in combination with drawings. As shown in FIGS. 1-3, common members of the present invention and the existing standard test methods are a light source, a light collection system and a detector receiving system, and have the functions of collecting and measuring optical power of the light source which emerges through the fibre. Differences from the traditional methods which are generally used currently in China and abroad are as follows: in a variable aperture method, outgoing light and each light transmission aperture should be coaxially centered; then, optical power collected after the light passes through nearly 20 through holes with different radius is respectively measured; and summation calculation of multinomial series is performed; in far-field scan, more points should be measured, and an approximate integral result can be obtained by virtue of more complicated calculation; and in the present invention, only a ratio of optical power collected in two states that the outgoing light of the fibre passes through and does not pass through a gradually variable aperture optical integrator should be measured, and the MFD that conforms to the Petermann II definition can be obtained according to the formula (6) by virtue of simple calculation. The present invention achieves the effects as follows: measurement accuracy of the MFD is increased, and the measurement speed is also greatly increased.

In order to realize measurement of the MFD of the single-mode fibre, a mean square value $\overline{NA^2}$ of a numerical aperture of the single-mode fibre is measured at first wherein $NA=\sin\theta$. Brief description is given below through several specific solutions. External shapes of the used optical integrators (called integrators for short) may be square or circular.

Solution 1: as shown in FIG. 1, a square gradually variable aperture optical integrator is placed in an outgoing light path of the fibre, and is enabled to horizontally slide along a fixed parallel track, and is adjusted and centered to measure P(i); and the gradually variable aperture optical integrator 3 slides out of the light path to measure P(o), and the measured ratio of the two optical powers is substituted into the formula (6), so that the MFD of the test fibre may be rapidly obtained. Like a slide, the square integrator can slide in and out. As the name suggests, the method is called a slide method. Specifically, in FIG. 1, list of numerals: light source 1, test fibre 2, gradually variable aperture optical integrator 3, light collection system 4, and detector 5.

Solution 2: as shown in FIG. 2, a circular light-proof disk 33 is provided with two circular through holes 31 on the circular light-proof disk. The circular light-proof disk 33 is placed in the light path and then a circular gradually variable aperture optical integrator 32 is embedded into any one of the two through holes 31, with the other one as a through hole 31 on the disc. When the circular disc 33 is mounted, the two through holes 31 in the disc should be coaxial with a light collection system 4 by virtue of rotation. Then, the emergent end of the test fibre is adjusted so that the exiting end is also positioned on the same axis. The disc 33 is rotated; the circular gradually variable aperture optical integrator 32, the through hole 31 of the circular disc and the light collection system 4 are coaxial with the system in sequence; and P(i) and P(o) are measured respectively, thereby obtaining the MFD according to the formula (6). Since the disc 33 is rotated by 180 degrees to complete measurement of the MFD, the solution is called a rotation method. For further description, an outline of the optical integrator is the same as an outline of the through hole of the disc; light of the test fibre emerges from the integrator; a single measurement is performed and the P(i) is recorded; and then the disc 33 is rotated, so that the through hole 31 is rotated to a previous position where the gradually variable aperture optical integrator 32 is positioned; the light of the test fibre emerges from the through hole 31; a single measurement is again performed and the P(o) is recorded. Specifically, in FIG. 1, reference numerals are as follows: light source 1, test fibre 2, through holes 31 of the circular disc, gradually variable aperture optical integrator 32 (i.e. the circular optical integrator), circular disc 33, light collection system 4, and detector 5.

Solution 3: as shown in FIG. 3, an optical beam splitter 6 is arranged at a position, close to the emergent end of the fibre 2, between the emergent end of the fibre and a gradually variable aperture optical integrator 3, and forms an angle of 45 degrees with a central axis of the light collection system 4. In this way, a beam of light which passes through the optical beam splitter 6 passes through the gradually variable aperture optical integrator 3 and is converged into a detector 5 by the light collection system, thereby obtaining an optical power P*(i); and another beam of light is reflected by the optical beam splitter 6 and converged into another detector 5, thereby obtaining the power P*(o). If the total power of the outgoing light of the fibre is P(o), a transmission coefficient and a reflection coefficient of the optical beam splitter 6 are respectively $k_t$ and $k_r$, and then $$P^*(i)=k_t P(i) \tag{9}$$

$$P^*(o)=k_r P(o) \tag{10}$$

Note: the quadratic mean value of the numerical aperture of the fibre should be $$\overline{NA^2}=P(i)/kP(o)=(k_r/k_t)\times[P^*(i)/kP^*(o)] \tag{11}$$

Similarly, the above formula is substituted into the formula (6), thereby solving the MFD. Since measurement of the MFD of the single-mode fibre is completed by virtue of beam splitting, the method is called a beam-splitting method. The beam-splitting method can immediately measure the MFD of the fibre without changing the position of the gradually variable aperture optical integrator, so the measurement speed is highest and corresponding engineering instruments may be manufactured more conveniently.

Figure 4:
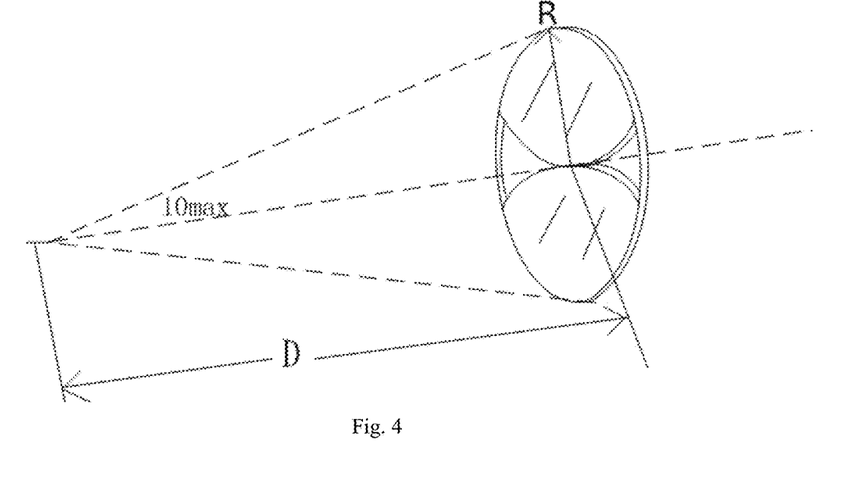
FIG. 4 is a schematic diagram of a placement distance and centering adjustment of outgoing light of fibre and an integrator.
Figure 5:
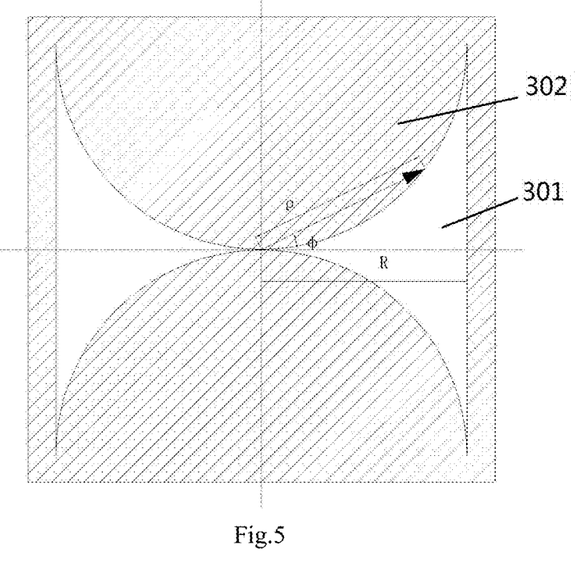
FIG. 5 is a schematic diagram of a square gradually variable aperture optical integrator.
Figure 6:
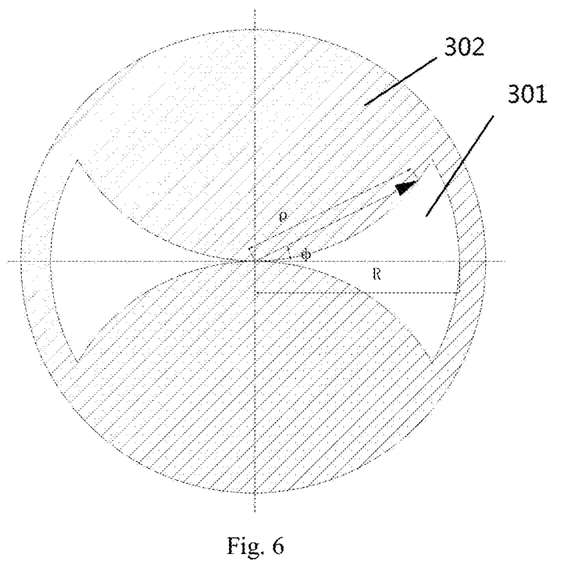
FIG. 6 is a schematic diagram of a circular gradually variable aperture optical integrator.

Positioning and coaxial centering adjustment problems of the fibre may be involved in the measurement of the MFD of the single-mode fibre by using the gradually variable aperture optical integration technique. According to design characteristics of the gradually variable aperture optical integrator, the farther the integrator deviates from a horizontal direction, the larger the light transmitting region is, while the case is completely opposite along a vertical direction. Therefore, during coaxial centering adjustment, only the optical power measured in the horizontal direction is minimized, and the optical power measured in the vertical direction is the maximized. Brief graphical representations are given in FIG. 4, FIG. 5, and FIG. 6 in order to explain the solutions. FIG. 5 shows the square gradually variable aperture optical integrator, and FIG. 6 shows the circular gradually variable aperture optical integrator. 301 is the aperture of the light-transmitting region and 302 is the light-proof region.

What is claimed is:

1. A gradually variable aperture optical integrator for measuring mode field diameter (MFD) of a single-mode fibre, characterized in that the integrator comprises a light-transmitting region and a light-proof region;
the light-transmitting region comprises two adjacent horn-shaped apertures extending outwardly from a geometric center of an interior of the gradually variable aperture optical integrator;
the two adjacent apertures being symmetrical with a geometric center of the gradually variable aperture optical integrator, and a boundary of the light-transmitting region satisfies the following polar coordinate formula:

$\rho = D \times [2\varphi/(k\pi - 2\varphi)]^{1/2}$, wherein $1 \leq k \leq 5$;
a maximum polar radius R of the boundary of the light-transmitting region satisfies the following formula:

$R \geq D \times \tan(25°)$, wherein in the two formulas, D is a perpendicular distance from a fibre end face of the single-mode fibre to the gradually variable aperture optical integrator;
a central point of the gradually variable aperture optical integrator is a polar coordinate origin;
$\rho$ is a polar radius of the boundary of the apertures in the radial coordinate; and
$\varphi$ is a polar angle of the boundary of the apertures in the angular coordinate.

2. The method of measuring a mode field diameter (MFD) of a single-mode fibre by using the optical integrator of claim 1, characterized in that the method comprising:
obtaining an optical power P(o) directly collected by a light collection system, after light with an operating wavelength of $\lambda$ passes through the single-mode fibre;
moving the gradually variable aperture optical integrator into an outgoing optical path of the measured single-mode fibre such that outgoing light having a wavelength of $\lambda$ sequentially passes through the gradually variable aperture optical integrator, the light collection system and a detector
measuring an optical power P(i) passing through the gradually variable aperture optical integrator;
obtaining the MFD of single-mode fibre according to the following formula:

$MFD = (\sqrt{2}\lambda/\pi)[kP(o)/P(i)]^{1/2}$.

3. The method of claim 2, characterized in that the gradually variable aperture optical integrator is slid horizontally, enabling an outgoing optical path of the measured single-mode fibre to pass or not pass the gradually variable aperture optical integrator.

4. The method of claim 2, characterized in that
by rotating a circular light-proof disk, the outgoing light of the single-mode fibre respectively passes through the circular gradually variable aperture optical integrator or a through-hole of the circular light-proof disk to obtain respectively the P(i) or the P(o);
wherein the gradually variable aperture optical integrator is embedded in any one of two circular through holes of the circular light-proof disk.

5. The method of claim 2, characterized in that an optical beam splitter is further provided between the fibre end face of the single-mode fibre and the gradually variable aperture optical integrator;
a portion of the outgoing light is collected with the optical power P*(i), after penetrating the optical beam splitter and then passing through the gradually variable aperture optical integrator;
an other portion of the outgoing light is reflected and converged at a second detector with an optical power P*(o);
a quadratic mean $\overline{NA^2}$ is obtained, wherein a numerical aperture of the single-mode fibre $NA = \sin\theta$:

$\overline{NA^2} = P(i)/kP(o) = (k_r/k_t) \times [P^*(i)/kP^*(o)]$, wherein $k_r$ and $k_t$ are respectively transmission and reflection coefficients of the optical beam splitter;
MFD is obtained by $MFD = (\sqrt{2}\lambda/\pi)(\overline{NA^2})^{-1/2}$.

* * * * *